United States Patent [19]

Sanchez et al.

[11] Patent Number: 5,700,880
[45] Date of Patent: Dec. 23, 1997

[54] PROCESS FOR THE PREPARATION OF POLY(OXYALKYLENE) TERPOLYMER BY HYDROGENATION

[75] Inventors: Jean-Yves Sanchez, Saint-Ismier; Fannie Alloin, Grenoble; Jacqueline Masson, Eybens, all of France

[73] Assignees: Centre National de la Recherche Scientifique, Paris, France; Hydro-Quebec, Quebec, Canada

[21] Appl. No.: 495,580

[22] PCT Filed: Dec. 8, 1994

[86] PCT No.: PCT/FR94/01432

§ 371 Date: Sep. 22, 1995

§ 102(e) Date: Sep. 22, 1995

[87] PCT Pub. No.: WO95/15991

PCT Pub. Date: Jun. 15, 1995

[30] Foreign Application Priority Data

Dec. 9, 1993 [FR] France ............... 93 14775

[51] Int. Cl.⁶ ................................................ C08L 71/02
[52] U.S. Cl. ................... 525/403; 525/404; 528/266
[58] Field of Search ................................ 525/403, 404; 528/266

[56] References Cited

U.S. PATENT DOCUMENTS

| 4,758,483 | 7/1988 | Armand et al. | 429/192 |
| 5,021,308 | 6/1991 | Armand et al. | 429/194 |
| 5,072,040 | 12/1991 | Armand | 564/82 |
| 5,136,097 | 8/1992 | Armand | 568/28 |
| 5,162,177 | 11/1992 | Armand et al. | 562/828 |
| 5,260,145 | 11/1993 | Armand et al. | 429/50 |
| 5,350,646 | 9/1994 | Armand et al. | 429/192 |
| 5,393,847 | 2/1995 | Alloin et al. | 525/403 |
| 5,414,117 | 5/1995 | Armand et al. | 429/194 |
| 5,459,228 | 10/1995 | Armand et al. | 528/373 |

FOREIGN PATENT DOCUMENTS 2 693 731  1/1994  France.

*Primary Examiner*—W. Robinson H. Clark
*Attorney, Agent, or Firm*—Oblon, Spivak, McClelland, Maier & Neustadt, P.C.

[57] ABSTRACT

The invention relates to a process for the preparation of copolymers or polycondensates having solvating properties. The process for the preparation of a copolymer or a polycondensate comprised essentially of solvating units susceptible of inducing crystallinity, units reducing the crystallinity of the copolymer or of the polycondensate, and optionally cross-linkable units, all said units being of the oxyalkylene type or of the oxyalkenylene type, is characterized in that during a first step, a copolymer or a polycondensate is prepared, said copolymer or polycondensate comprising solvating units susceptible of inducing crystallinity and units which have a carbon/carbon insaturation in conditions which do not affect said insaturation and in that during a second step, at least a portion of the insaturations is subjected to hydrogenation. Application to the preparation of copolymers useful for producing ionic condition materials.

20 Claims, No Drawings

PROCESS FOR THE PREPARATION OF POLY(OXYALKYLENE) TERPOLYMER BY HYDROGENATION

BACKGROUND OF THE INVENTION

The present invention relates to a process for the preparation of copolymers exhibiting solvating properties, useful for the production of ionically conductive materials.

It is known to employ solvating polymers for the production of ionically conductive materials. Ethylene oxide and dioxolane polymers are polymers which solvate cations, in particular alkali metal cations such as, for example, the $Li^+$ ion present in the rechargable electrochemical generators of the lithium battery type with a polymer electrolyte. However, these polymers are semicrystalline, the degree of crystallinity changing as a function of the molecular mass of the polymer. This semicrystalline nature of the polymers has the consequence of decreasing the conductivity of the materials which contain it.

Solvating polymers which are amorphous throughout the range of temperatures of use, for example poly(propylene oxide) (PPO), have also been employed for the production of ionically conductive materials. The ionic conductivity at ambient temperature of the $PPO/LiClO_4$ or $PPO/CF_3SO_3Li$ complexes is markedly higher than that of their polyethylene oxide (PEO) homologues; however, at higher temperatures, salt precipitations appear in the $PPO/LiClO_4$ or $PPO/CF_3SO_3Li$ complexes, and this makes their conductivity lower than that of the $PEO/LiClO_4$ or $PEO/CF_3SO_3Li$ complexes at these elevated temperatures.

It was then found that it was possible to decrease the crystallinity of semicrystalline polymers, without affecting their solvating properties and their electrochemical stability, by introducing irregularities into the macromolecular chain, if possible at a regular interval. Examples which may be mentioned are the copolymers obtained from a substituted oxirane and from a cyclic ether containing more than 3 carbon atoms (U.S. Pat. No. 4,758,483, M. Armand, D. Muller et al.) or the copolymers of oxirane and of dioxolane (French Patent Application filed under No. 92.08716, G. Goulart et al.).

However, it was found that the introduction of units creating irregularities into a semicrystalline polymer such as, for example, a PEO of high mass, that is to say the replacement of the semicrystalline polymer with a copolymer or a polycondensate, was frequently accompanied by a decrease in the mechanical properties, especially at high temperature. Attempts were made to overcome this disadvantage by introducing into the polymer, units which make it possible to form three-dimensional networks by crosslinking the copolymer before or after it is shaped. Because of the constraints imposed by the electrochemical stability requirements, the units permitting crosslinking which are particularly preferred are chosen from carbon-carbon unsaturations such as the allyl or vinyl functional groups. It then appeared that when a sufficiently large quantity of units were introduced into the polymer in order to reduce the crystallinity to the desired degree, the copolymer contained a very large number of crosslinking nodes. The electrolyte which contained such a copolymer then had a very high glass transition temperature, and this decreased its ionic conductivity, its elastomeric nature and the adhesion between the electrolyte and the electrodes. On the other hand, when the quantity of crosslinkable monomer was maintained at a sufficiently low level for the elastomeric properties to be preserved, the chain sequences of solvating units were long and, as a result, the crystallinity was maintained at a high level.

To overcome these disadvantages, copolymers were then employed which simultaneously contained solvating units, units capable of decreasing the crystallinity and containing no carbon-carbon unsaturations, and units capable of decreasing the crystallinity and containing carbon-carbon unsaturations. Various processes of preparation were developed for this purpose. However, the copolymerization or the condensation of three different monomers is generally more complicated and more burdensome than the copolymerization or the condensation of only two monomers. This applies to the polymerization of an ethylene oxide/allyl glycidyl ether/methyl glycidyl ether terpolymer, when compared with the preparation of an ethylene oxide/allyl glycidyl ether copolymer, because of the high cost of methyl glycidyl ether.

SUMMARY OF THE INVENTION

The aim of the present invention is to propose a process which is simpler and economically more advantageous than the processes of the prior art for the preparation of a copolymer exhibiting solvating properties, good mechanical behaviour and an elastomeric nature.

The process of the present invention is a process for the preparation of a copolymer or of a polycondensate in which the macromolecular chain consists essentially of solvating units capable of inducing a crystalline nature, units making it possible to decrease the crystallinity of the copolymer or of the polycondensate, and optionally crosslinkable units, all these units being of the oxyalkylene type or of the oxyalkenylene type independently of one another, characterized in that:

during a first step a copolymer or a polycondensate is prepared, containing solvating units capable of inducing a crystalline nature and units which have a carbon-carbon unsaturation, in conditions which do not affect the said unsaturation;

during a second step the hydrogenation of at least part of the unsaturations is undertaken.

DETAILED DESCRIPTION OF THE PREFERRED EMBODIMENTS

In the text which follows, the expression "solvating unit" will refer to a solvating unit capable of inducing a crystalline nature, the expression "unsaturated unit" will refer to a unit which includes a carbon-carbon unsaturation and the expression "unit decreasing the crystallinity" will refer to a unit enabling the crystallinity of the copolymer or of the polycondensate to be decreased.

In the copolymer obtained at the end of the first step the solvating units are oxyalkylene units in which the alkylene group optionally carries a methyl substituent.

The unsaturated units may be oxyalkylene units in which the alkylene group carries a substituent including a carbon-carbon unsaturation which can be polymerized by a radical route and which is inert in the copolymerization conditions of the first step of the process, or oxyalkenylene units in which the carbon-carbon double bond can be polymerized by a radical route.

The hydrogenation of the copolymer or of the polycondensate obtained at the end of the first step of the process may be performed under hydrogen pressure in the presence of a catalyst which may be chosen from the catalysts employed in the prior art for the hydrogenation of the carbon-carbon unsaturations, and especially Raney nickel, a catalyst of the coordinated type containing a transition metal, for example Co or Ni, a reducing agent of the trialkylaluminium type and an unsaturated hydrocarbon such as cyclohexene, a cobalt-pyridine complex, a chelate of nickel and of phenol or a borate of the $BH_3+CH_3CO_2H$ type. The hydrogenation may also be performed by means of a hydrogenating agent such as p-toluenesulphonohydrazide.

When the hydrogenation of the copolymer obtained in the first step of the process of the present invention is performed in the presence of Raney nickel, the copolymer is dissolved in methanol and the Raney nickel is added. The weight concentration of copolymer in the solution is chosen as a function of the composition of the copolymer, that is to say of the proportion of unsaturated monomer units in its macromolecular chain, and of the proportion of unsaturated units which it is intended to hydrogenate. A quantity of copolymer is generally chosen such that the molar concentration of double bonds is between $10^{-2}$ and $5\times10^{-2}$ mol/l. The reaction is performed at a hydrogen pressure of between $8\times10^5$ Pa and $5\times10^6$ Pa. The temperature of the reaction mixture is maintained between 18° C. and 100° C., depending on the proportion of unsaturated units which it is intended to hydrogenate. The quantity of Raney Ni introduced depends on the double-bond content and varies between 1 and 10 g/l, the high catalyst concentrations corresponding to the highest degrees of hydrogenation.

When the hydrogenation of the copolymer is performed by means of p-toluenesulphonohydrazide, the copolymer is dissolved in a solvent chosen from xylene, dimethylformamide and diglyme and the p-toluene-sulphonohydrazide is added in a quantity such that the ratio of the number of double bonds to the number of moles of catalyst is between 0.5 and 1.

When only some of the unsaturated units are hydrogenated, the process of the invention makes it possible to obtain a copolymer containing three different types of units, namely solvating units, units decreasing the crystallinity and unsaturated units, from two types of monomers. A process for the preparation of terpolymers is thus available which is simpler and more economical than the processes of the prior art, in which three different types of monomers are copolymerized.

The process of the invention also presents an advantage when the second step consists of a hydrogenation of all the unsaturated units. It then makes it possible to introduce saturated units into the chain of a polymer from an unsaturated monomer. This possibility is useful when the use of an unsaturated monomer is more advantageous than the use of the corresponding saturated monomer, for example for reasons of difficulty in preparation or in polymerization, or for economic reasons.

The first step of the process of the present invention may be put into use in accordance with different alternative forms and with monomers or prepolymers of different nature, depending on the nature of the final copolymer sought after.

According to one embodiment, the first step of the process of the present invention may consist of a copolymerization by a cationic route of at least one cyclic alkylene oxide or cyclic acetal monomer containing at least three chain units, unsubstituted or carrying a methyl substituent, and of at least one cyclic alkylene oxide or cyclic acetal monomer containing at least three chain units, carrying a substituent which contains a carbon-carbon double bond. Oxiranes, oxetanes and dioxolanes and the like may be mentioned, for example, among these monomers. In this case, the solvating units may be provided, for example, by ethylene oxide, propylene oxide, oxetane or dioxolane optionally carrying a methyl substituent, and the unsaturated units may be provided, for example, by butadiene monoxide, 1,2-epoxy-5-hexene, 1,2-epoxy-7-octene, allyl glycidyl ether and furfuryl glycidyl ether. By way of example there may be mentioned the cationic polymerization of dioxolane

which provides the solvating units, and of an oxirane

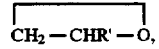

which carries an unsaturated substituent R', the substituent R denoting a hydrogen atom or a methyl radical; it being possible for the substituent R' to be chosen from the radicals which contain an ethylenic unsaturation, such as, for example, the alkenyl radicals $CH_2=CH-(CH_2)_q-$ in which $1 \leq q \leq 6$ and the radicals $CH_3-(CH_2)_y-CH=CH-(CH_2)_x-$ in which $0 \leq x+y \leq 5$ and $0 \leq x$ (for example a butene radical) or from allyloxyalkylene radicals containing from 4 to 8 carbon atoms (for example $-CH_2-O-CH_2-CH=CH_2$). The cationic polymerization of the appropriate oxirane and dioxolane is advantageously performed in the presence of an initiator chosen from $BF_3(OC_2H_5)_2$, $C_6H_5COX^1$ or $C_6H_5CH_2X^1$ in which $X^1$ denotes $SbF_6$, $PF_6$, $AsF_6$, $BF_4$, $ClO_4$ or $CF_3SO_3$, $SbF_6$ being particularly preferred, or $pCl-C_6H_4N_2Y^1$, $Y^1$ denoting $PF_6$ or $BF_4$.

In another embodiment, the copolymers of the first step of the process of the present invention may be obtained by a polycondensation reaction, in the presence of a base B', of at least one compound $A'(OH)_i$ with at least one compound $Z(CH_2X)_j$, the relative proportions of the different $A'(OH)_i$ being such that the ratio of the number of ether functional groups to the number of segments A' is at least equal to 2, the relative proportions of the different $Z(CH_2X)_j$ being such that the ratio of the number of radicals X to the number of segments Z is at least equal to 2. In the above formulae, A' denotes a solvating segment not capable of being crosslinked by a radical route, which has a valency i such that $1 \leq i \leq 6$; Z denotes an organic radical which has a valency j such that $1 \leq j \leq 6$, and additionally containing at least one carbon-carbon unsaturation; X denotes a leaving group. The compound $A'(OH)_i$ is chosen from polyoxyethylene glycols, polyoxypropylene glycols, copolyoxyethylene-oxypropylene glycols, glycols of copolymers of ethylene oxide or of propylene oxide with a comonomer capable of polymerizing by forming ether bonds, it being possible for the said polymerizable comonomer to be oxymethylene, oxetane, tetrahydrofuran and dioxolane. The radicals which may be mentioned among the radicals that are appropriate in the case of Z are those derived from dihaloalkenes, for example the radicals derived from a cis-dihalo-2-butene, from a trans-dihalo-2-butene, from a dihalo-2-methylpropene or from a cis-dihalo-2,4-hexadiene. The leaving group X may be a halide, more particularly a chloride, a bromide or an iodide, or else a sulphate $R'OSO_3$ or a sulphonate $R'SO_3$, in which R' denotes an organic group containing fewer than 20 carbon atoms, preferably an alkyl group, an aryl group, an alkylaryl group, it being possible for these groups to be optionally halogenated. The dihaloalkylenes, for example 3-chloro-2-chloromethyl-1-propene are particularly preferred.

The base B' is chosen from alkali or alkaline-earth metal hydroxides, quaternary ammonium hydroxides, in particular anion exchange resins containing benzyltrialkylammonium groups in the form of hydroxide, alkali or alkaline-earth metal hydrides, amides or alkoxides, and organic bases which are nonnucleophilic and difficult to quaternize, such as 1,8-bis(dimethylamino)naphthalene and 1,2,2,6,6-pentamethylpiperidine.

According to another embodiment the copolymers of the first step of the process of the present invention may be prepared by a process in which a copolymerization is performed in the presence of a Vandenberg catalyst, of an oxirane corresponding to the formula

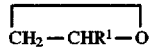

and of an oxirane corresponding to the formula

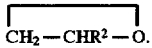

In the monomer

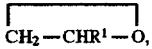

$R^1$ denotes a radical containing a carbon-carbon unsaturation, chosen, for example, from the alkenyl radicals $CH_2=CH-(CH_2)_q-$ in which $1 \leq q \leq 6$ and the alkenyl radicals $CH_3-(CH_2)_y-CH=CH-(CH_2)_x-$ in which $0 \leq x+y \leq 5$ and $0 \leq x$, for example the radical $-CH_2-CH_2-CH=CH_2$. $R^1$ may also be chosen from the allyloxyalkylene radicals containing from 4 to 8 carbon atoms, for example the radical $-CH_2-O-CH_2-CH=CH_2$. $R^1$ may also be chosen from the radicals $CH_2=CH-CO-O-CH_2-$, $CH_2=C(CH_3)-CO-O-CH_2-$ and $CH_2=CH-\Phi-O-(CH_2)_n-$. In the monomer

$R^2$ denotes a hydrogen atom or a methyl radical.

The Vandenberg catalyst includes an initiator and a coinitiator. The initiator is chosen from organometallic compounds such as the compounds of the trialkylaluminium type, in particular triethylaluminium or tributylaluminium, compounds of the dialkylzinc or diarylzinc type, in particular diethylzinc or diphenylzinc. The coinitiator is generally water, and the mixture may also contain diethyl ether as diluent.

In another embodiment the copolymer of the first step may be obtained by an anionic copolymerization of at least one solvating monomer and of at least one monomer containing a carbon-carbon unsaturation, in the presence of a catalyst chosen from alkali metal alcoholates. In this embodiment, the solvating monomer may be chosen from oxiranes corresponding to the formula

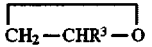

in which $R^3$ denotes H or a methyl radical. The unsaturated oxirane may be chosen from the oxiranes corresponding to the formula

in which $R^4$ denotes a radical containing an unsaturated bond which does not react in the conditions of an anionic polymerization, chosen, for example, from the radicals which have the formula $CH_2=CH-(CH_2)_q-(O-CH_2)_p$ with $1 \leq q \leq 6$ and $p=0$ or 1, or the formula $CH_3-(CH_2)_y-CH=CH-(CH_2)_x-(OCH_2)_p$ with $0 \leq x+y \leq 5$ and $p=0$ or 1.

According to yet another embodiment the first step of the process of the present invention consists in preparing a block copolymer containing at least one solvating segment A consisting of oxyalkylene units in which the alkylene group optionally carries a methyl substituent, and at least one segment B consisting of oxyalkylene units in which the alkylene group carries a substituent containing a carbon-carbon unsaturation which can be polymerized by a radical route and which is inert in the copolymerization conditions of the first step of the process and/or oxyalkenylene units in which the carbon-carbon double bond can be polymerized by a radical route. A copolymer of the AB type or of the BAB type can be obtained by attaching one or two segments B to a precursor polymer of the segment A.

The precursor polymer of the segment A can be prepared from the appropriate monomer(s) by an anionic or cationic polymerization or by polycondensation, depending on the nature of the reactive functional groups carried by the monomers. Commercial polymers such as, for example, poly(ethylene oxide) glycols can also be employed for the segment A.

Two methods of attaching the segment B may be used. Either the segment B is first of all prepared by polymerization of the chosen monomer(s) and then the segment B is grafted onto the precursor of the segment A by means of appropriate reactive functional groups present at the ends of A. Alternatively, the precursor of the segment A is brought into contact with the precursor monomer(s) of the segment B and a polymerization is initiated by a process which does not affect the carbon-carbon unsaturations existing in the precursor monomers of the segment B.

When the reactive functional end groups of the precursor polymer of the segment A are hydroxyl radicals —OH or amine groups —NHR, they initiate an anionic polymerization of the reactants constituting B, after treatment with a deprotonating base such as NaH, KH, $KOC(CH_3)_3$, KOH or $Na^+$[naphthalene].

The AB or ABA copolymers may be prepared similarly to the BA or BAB copolymers. In this case the segment B is first of all prepared by polymerization of the appropriate monomer(s). The segment(s) A is (are) then grafted either in the form of a preconstituted segment, or by bringing the segment B into contact with precursor monomers of A in appropriate polymerization conditions.

Of course, the process of the present invention is not limited to the embodiments indicated above in the case of the first step of the process, which are given merely by way of example, but includes all the processes making it possible to obtain a copolymer containing solvating units and unsaturated units which are of the oxyalkylene type or of the oxyalkenylene type, it being possible for both types to coexist in the same macromolecule.

The copolymers obtained by the process of the present invention are useful for the production of ionically conductive materials. Those which no longer contain any unsaturated units may additionally be employed for the production of electrodes.

For the preparation of an ionically conductive material intended to be employed as electrolyte it is preferable to employ a copolymer in which there remain units containing unsaturations which permit a crosslinking with a view to improving the mechanical properties. In one particular embodiment an ionically conductive material includes essentially an ionic compound which is easily capable of dissociating in solution in a copolymer according to the present invention. The ionic compound introduced into the copolymer is chosen from the ionic compounds usually employed for the ionically conductive solid polymer materials. Those which may be mentioned by way of example are the ionic compounds $(1/mM)+Y^-$, in which $M^{m+}$ denotes a proton, a metal cation, an organic cation of the ammonium, amidinium or guanidinium type, m being the valency of the cation $M^{m+}$; $Y^-$ denotes an anion with a delocalized electronic charge, for example $Br^-$, $ClO_4^-$, $AsF_6^-$, $R_FSO_3^-$, $(R_FSO_2)_2N^-$, $(R_FSO_2)_3C^-$, $C_6H_{(6-x)}(CO(CF_3SO_2)_2C^-)_x$ or $C_6H_{(6-x)}(SO_2(CF_3SO_2)_2C^-)_x$, $R_F$ denoting a perfluoroalkyl or perfluoroaryl group, with $1 \leq x \leq 4$. The preferred ionic compounds are lithium salts and, more particularly $(CF_3SO_2)_2N^-Li^+$, $CF_3SO_3^-Li^+$, the compounds $C_6H_{(6-x)}$—$[CO(CF_3SO_2)_2C^-Li^+]_x$ in which x is between 1 and 4, preferably with x=1 or 2, and the compounds $C_6H_{(6-x)}$—$[SO_2(CF_3SO_2)_2C^-Li^+]_x$ in which x is between 1 and 4, preferably with x=1 or 2. Mixtures of these salts with one another or with other salts may be employed. Mixtures of salts which may be mentioned by way of examples are: $(CF_3SO_2)_2N^-Li^+$ and $CF_3SO_3^-Li^+$ or $(CF_3SO_2)_2N^-Li^+$ and $C_6H_4$—$[CO(CF_3SO_2)_2C^- Li^+]_2$ in various proportions, but preferably including from 20 to 40% by weight of $(CF_3SO_2)_2N^-Li^+$.

In another embodiment it is possible to employ a copolymer according to the invention which includes unsaturated units onto which are grafted ionic compounds which contain a crosslinkable carbon-carbon double bond.

Of course, an ionically conductive material including essentially a copolymer obtained by the process of the present invention may additionally contain the ingredients which are conventionally present in ionically conductive materials of the organic polymer type, and especially plasticizers such as, for example, N,N,N',N'-tetraethylsulphonamide or propylene carbonate, which have the effect of increasing the ionic conductivity of the materials.

The ionically conductive materials of the present invention are particularly useful for electrochemical generators, rechargeable or otherwise. In such a generator, which includes a negative electrode and a positive electrode separated by a polymeric solid electrolyte, the electrolyte and/or at least one of the electrodes, if it is composite, consist essentially of an ionically conductive material including a copolymer obtained by the process of the present invention.

The copolymers are also useful in other electrochemical systems, such as electrochromic systems, light-modulating systems and for the production of selective membranes or of reference membranes in membrane sensors.

The present invention is described in greater detail with the aid of the following examples, which are given in order to illustrate the invention, but which are not limiting in nature.

EXAMPLE 1 a) Preparation of a copolymer

Into a two-necked round bottom flask fitted with a mechanical stirrer bearing were introduced 4 g of poly (oxyethylene)diol of mass 400 (PEO 400) (marketed by Aldrich under reference 20,239-8), 10 g of poly (oxyethylene)diol of mass 1000 (PEO 1000) (marketed by Aldrich under reference 20,242-8) and 2.48 g of 3-chloro-2-chloromethyl-1-propene. The mixture was heated to 40° C. with energetic mechanical stirring and 6 g of finely ground potassium hydroxide were then added. After 10 hours' reaction a product was obtained with a mass of Mw=72000 and Mn=34000, as polystyrene equivalent. The product was dissolved in THF to remove the remaining KOH and the KCl formed. After evaporation of the THF the product was dissolved in water and the remaining KOH was neutralized by adding an Amberlite IR118 acidic resin, marketed by Rohm & Haas. The mixture was then filtered to remove the resin, the water was distilled off and the drying was completed in a vacuum desiccator at 50° C. for 48 hours.

The copolymer obtained had a melting temperature $T_m=12.7°$ C., intermediate between the melting temperature of the PEO 1000 and that of the PEO 400.

b) Hydrogenation of the polycondensate 237 mg of Raney Ni in 120 ml of methanol were added to 10 g of the polycondensate obtained in a). The reaction was performed in a reactor maintained at 18° C. at a hydrogen pressure of $8 \times 10^5$ Pa for 30 minutes. The polycondensate was then recovered and the catalyst was removed with the aid of a magnet. The methanol was removed by evaporation.

A proton NMR analysis of the final copolymer obtained made it possible to ascertain that 50% of the double bonds were hydrogenated. This copolymer contained solvating —$CH_2$—$CH_2$—O— units, saturated —$CH_2$—$CH(CH_3)$—O— units and unsaturated —$CH_2$—$CH(=CH_2)$—O— units.

c) Preparation of an ionically conductive membrane

The copolymer obtained in b) was dissolved in acetonitrile in the presence of benzoyl peroxide, the weight ratio of the peroxide to the copolymer being 4%. The solution obtained was poured onto a glass sheet, the acetonitrile was then evaporated off and the film obtained was heated to 80° C. and kept at this temperature for 3 hours under argon atmosphere. A crosslinked elastic membrane was thus obtained.

This membrane was immersed in a 1M solution of the lithium salt of bis(trifluoromethanesulphonimide) in acetonitrile, the volume of the solution being such that the O/Li ratio of the impregnated membrane was equal to 14. The conductivity of the membrane thus treated, measured at 25° C., was $2 \times 10^{-5}$ S cm$^{-1}$, which represents twice the conductivity of a membrane treated in a similar manner but obtained from the unhydrogenated copolymer from step a).

EXAMPLE 2 a) Preparation of the copolymer

A copolymer of ethylene oxide and of allyl glycidyl ether was prepared by a Vandenberg coordinated polymerization. The reaction was performed in a reactor under argon pressure, using a triethylaluminium ether/acetone mixture as initiator. The copolymer obtained contains, on average, 1 allyl glycidyl ether unit per 20 ethylene oxide units.

b) Hydrogenation of the copolymer 10 g of the copolymer obtained in a) were introduced into a reactor and 400 mg of Raney nickel in 120 ml of methanol were added thereto under a hydrogen pressure of $8 \times 10^5$ Pa. The mixture was then heated to 40° C. and kept at this temperature for 4 hours.

The polymer was next recovered and the catalyst was removed with the aid of a magnet. The methanol was removed by evaporation.

The number of hydrogenated double bonds, determined by $^1$H NMR, is 75%.

The copolymer obtained contained solvating ethylene oxide units, unsaturated allyl glycidyl ether units and saturated propyl glycidyl ether units.

c) Preparation of a membrane

A membrane was prepared by jointly dissolving in acetonitrile the copolymer obtained in b) and the salt $(CF_3SO_2)_2N^-Li^+$ in proportions such that the O/Li ratio of the complex obtained was 14, the solution additionally containing 3% by weight of benzoyl peroxide. A film with a thickness of 100 µm was obtained in the same way as in Example 1. This film was next heated for 3 hours at 70° C. The material thus crosslinked exhibited good mechanical properties. Its conductivity was higher than $10^{-5}$ S cm$^{-1}$ starting from 20° C., which represents twice that of a film prepared from a copolymer obtained in a) above.

The film exhibited good mechanical behaviour; it was possible to obtain a relative elongation greater than 1000%.

In addition, it exhibited good electrochemical stability. The inspection of a voltage-current plot of the above complex, produced on a platinum microelectrode at 80° C., did not reveal any oxidation peak attributable to the degradation of the salt or of the copolymer in the potential range observed (0 V–4 V against lithium).

EXAMPLE 3 a) Preparation of the copolymer

A copolymer of ethylene oxide and of allyl glycidyl ether was prepared by anionic polymerization in a high-pressure reactor, using potassium tertbutylate as initiator. The ratio of the allyl glycidyl ether units to the ethylene oxide units, determined by proton NMR, is 1/30.

b) Hydrogenation of the copolymer 1 g of the copolymer obtained in a) above was dissolved in 50 ml of xylene and 0.13 g of p-toluenesulphonohydrazide was added, the ratio of the number of double bonds to the number of moles of p-toluenesulphonohydrazide thus being 1. The mixture was heated to the reflux of xylene. The kinetics of the reaction were followed by 1H NMR analysis of samples. The hydrogenation was complete after 15 minutes.

EXAMPLE 4 a) Preparation of the copolymer 5 ml of 2,2-dimethoxypropane were added to 70 g of commercial poly(ethylene glycol) of mass 1000 (marketed by Aldrich under reference 20,242-8). The mixture was then dried in a rotary evaporator at 60° C. to remove the residual water from the polymer. The polyethylene glycol thus dehydrated was dissolved in THF. 3 g of potassium hydride were added to the solution obtained, followed by 25 ml of allyl glycidyl ether. The mixture was kept at 50° C. for 2 hours and the polymer was then precipitated in ether and purified by dissolving in acetone and precipitating in ether three times.

The copolymer obtained contained a central poly (ethylene oxide) block of mass 2000 and two side blocks, each containing 30 allyl glycidyl ether units.

b) Hydrogenation of the copolymer 1 g of the block copolymer obtained in a) above was added to 1.13 g of p-toluenesulphonohydrazide in 30 ml of xylene, the ratio of the number of double bonds to the number of moles of p-toluenesulphonohydrazide thus being 0.9. The solution was then heated to 130° C. and kept at this temperature for 2 hours. $^1$H NMR investigation showed that 70% of the double bonds had been hydrogenated.

c) Preparation of a membrane

The copolymer obtained in b) was dissolved in acetonitrile in the presence of benzoyl peroxide, the weight ratio of the peroxide to the copolymer being 3%. The solution obtained was poured onto a glass sheet, the acetonitrile was then evaporated off and the film obtained was heated to 80° C. and kept at this temperature for 2 hours under argon atmosphere. A crosslinked elastic membrane was thus obtained, which exhibited good mechanical properties.

This membrane was immersed in a 1M solution of $(CF_3SO_2)_2N^-Li^+$ in acetonitrile, the volume of the solution being such that the O/Li ratio of the impregnated membrane was equal to 14. After evaporation of the acetonitrile the conductivity of the membrane thus treated, measured at 25° C., was $3\times10^{-5}$ S cm$^{-1}$ and $10^{-3}$ S cm$^{-1}$ at 65° C., which represents a gain of a factor of 2 at 25° C. and of a factor of 4 at 65° C. compared to a membrane treated in a similar manner but obtained from the unhydrogenated copolymer from step a).

EXAMPLE 5 a) Preparation of a copolymer

A copolymer of ethylene oxide and of allyl glycidyl ether similar to that of Example 3a) was prepared.

b) Hydrogenation of a copolymer 10 g of the above copolymer were dissolved in 120 ml of methanol, 300 mg of Raney Ni were added at 20° C. and the reaction mixture was kept at this temperature for 1 hour.

The number of hydrogenated double bonds, determined by $^1$H NMR, was 50%.

c) Preparation of a membrane

The copolymer obtained in b) was complexed with the lithium salt $(CF_3SO_2)_2N^-Li^+$. The O/Li ratio of the complex obtained was 9. The complex was next introduced into acetonitrile in the presence of 3% by weight of benzoyl peroxide. A film with a thickness of 200 µm was prepared with the aid of the solution obtained, in the same way as in Example 1, and the film was next heated for 2 hours at 70° C. under a flow of argon. The membrane obtained exhibited good mechanical properties. Its conductivity was $10^{-5}$ S cm$^{-1}$ starting from 20° C.

EXAMPLE 6

Using the procedure of Example 1, a polycondensate was prepared from poly(oxyethylene)diol of mass 1000 (PEO 1000) (marketed by Aldrich under reference 20,242 -8) and from 3-chloro-2-chloromethyl-1-propene. 10 g of the polycondensate obtained were next hydrogenated in the same conditions as in Example 1. $^1$H NMR analysis showed that 50% of the double bonds had been hydrogenated.

A crosslinked membrane was prepared by dissolving the polymer and 4% by weight of benzoyl peroxide in acetonitrile. After evaporation of the solvent the film obtained was heated to 80° C. for 3 hours under argon atmosphere. A crosslinked elastic membrane was thus obtained.

20% by weight of N,N,N',N'-tetraethyl-sulphonamide (TESA) were added to the crosslinked membrane. A conductivity of $2\times10^{-4}$ S cm$^{-1}$ at 20° C. was obtained in the case of a $(CF_3SO_2)_2N^-Li^+$ salt concentration corresponding to an O/Li ratio of the polymer-salt complex of 16.

EXAMPLE 7

300 mg of Raney Ni in 120 ml of methanol were added to 10 g of copolymer obtained in Example 3a and the reaction mixture was kept at 20° C. for 1 hour. Analysis by $^1$H NMR showed that 50% of the double bonds had been hydrogenated. The copolymer thus obtained, the salt $(CF_3SO_2)_2N^-Li^+$ and 3% by weight of benzoyl peroxide were dissolved in acetonitrile. The O/Li ratio of the polymer complex was 14. After evaporation a film with a thickness of 200 μm was obtained, which was crosslinked by heating at 70° C. for 2 hours under argon atmosphere. A membrane exhibiting good mechanical properties was thus obtained, to which 50% by weight of propylene carbonate was added. A conductivity of $8\times10^{-4}$ S cm$^{-1}$ was obtained at 25° C. at a salt concentration corresponding to an O/Li ratio of 14.

We claim:

1. A process for the preparation of a copolymer or of a polycondensate whose macromolecular chain consists essentially of solvating units capable of inducing crystallinity into the copolymer or polycondensate, units which decrease the crystallinity of the copolymer or of the polycondensate, and optionally crosslinkable units, all of these units being oxyalkylene units or oxyalkenylene units independently of one another, consisting essentially of:

in a first step, reacting monomers which introduce said solvating units into said copolymers or polycondensate and which induce crystallinity thereinto with carbon-carbon unsaturated monomers, under conditions which do not affect the unsaturation of the unsaturated monomer; and in a second step, partially hydrogenating the sites of unsaturation in the copolymer or precondensate.

2. The process according to claim 1, wherein the solvating units are oxyalkylene units in which the alkylene group optionally carries a methyl substituent.

3. The process according to claim 1, wherein the unsaturated units are oxyalkylene units in which the alkylene group carries a substituent containing carbon-carbon unsaturation whose corresponding monomer is radically polymerizable and which is inert to the copolymerization conditions of the first step of the process, or are oxyalkenylene units whose corresponding monomer containing carbon-carbon double bonds is radically polymerizable.

4. The process according to claim 1, wherein the hydrogenation of the copolymer or of the polycondensate obtained from the first step is performed under hydrogen pressure in the presence of a hydrogenation catalyst.

5. The process according to claim 4, wherein the hydrogenation catalyst is a Raney nickel catalyst, a catalyst of the coordinated type containing a transition metal, a reducing agent of trialkylaluminum and an unsaturated hydrocarbon, a cobalt-pyridine complex, a chelate of nickel and of phenol and a borate of the $BH_3+CH_3CO_2H$ type.

6. The process according to claim 1, wherein the hydrogenation is performed by p-toluenesulphonohydrazide.

7. The process according to claim 1, wherein the first step consists of cationically copolymerizing at least one cyclic alkylene oxide or cyclic acetal monomer containing at least three chain units, unsubstituted or carrying a methyl substituent, and at least one cyclic alkylene oxide or cyclic acetal monomer containing at least three chain units carrying a substituent which contains a carbon-carbon double bond.

8. The process according to claim 7, wherein said at least one cyclic alkylene oxide or cyclic acetal monomer containing at least three can units is ethylene oxide, propylene oxide, oxetane or dioxolane optionally carrying a methyl substituent, and said at least one cyclic alkylene oxide or cyclic acetal monomer containing at least three chain units is an oxirane

in which the substituent R' is a radical which contains ethylenic unsaturation, which is a $CH_2=CH-(CH_2)_q$-alkenyl radical in which $1 \leq q \leq 6$, a $CH_3-(CH_2)_y-CH=CH-(CH_2)_x-$ in which $0 \leq x+y \leq 5$ and $0 \leq x$, or an allyloxyalkylene radical which contains from 4 to 8 carbon atoms.

9. The process according to claim 1, wherein, during the first polymerization step, a polycondensation reaction is performed, in the presence of a base, of at least one compound A'(OH)$_i$ with at least one compound Z(CH$_2$)$_j$, the relative proportions of the different A'(OH)$_i$ being such that the ratio of the number of ether functional groups to the number of segments A' is at least equal to 2, the relative proportions of the different Z(CH$_2$X)$_j$ being such that the ratio of the number radicals X to the number of segments Z is at least equal to 2; A' denoting a solvating segment not capable of being radically crosslinked, which has a valency i such that $1 \leq i \leq 6$; Z denoting an organic radical which has a valency j such that $1 \leq j \leq 6$, and additionally containing at least one carbon-carbon unsaturation; X denoting a leaving group.

10. The process according to claim 9, wherein the compound A'(OH)$_i$ is a polyoxyethylene glycol, polyoxypropylene glycol, copolyoxyethylene-oxypropylene glycol or a glycol of a copolymer of ethylene oxide or of propylene oxide with a comonomer of oxymethylene, oxetane, tetrahydrofuran and dioxolane, which, upon polymerization, forms ether bonds.

11. The process according to claim 9, wherein the compound Z(CH$_2$X)$_j$ is a compound in which Z is an alkenyl radical and X is a leaving group.

12. The process according to claim 1, wherein, during the first step, the copolymerization of an oxirane of the formula

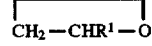

and of an oxirane of the formula

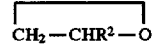

is performed in the presence of a Vandenberg catalyst, $R^1$ denoting a radical containing carbon-carbon unsaturation selected from the group consisting of alkenyl radical $CH_2=CH-(CH_2)_q-$ in which $1 \leq q \leq 6$, $CH_3-(CH_2)_y-CH=CH-(CH_2)_x-$ radicals in which $0 \leq x+y \leq 5$ and $0 \leq x$, allyloxyalkylene radicals containing from 4 to 8 carbons atoms, $CH_2=CH-CO-O-CH_2-$, $CH_2=C(CH_3)-CO-O-CH_2-$ and $CH_2=CH-\Phi-O-(CH_2)_n-$, $R^2$ denoting a hydrogen atom or a methyl radical.

13. The process according to claim 1, wherein, during the first step, anionic copolymerization is performed of at least one solvating monomer selected from the group consisting of oxiranes corresponding to the formula

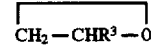

in which $R^3$ denotes H or a methyl radical, and at least one monomer containing carbon-carbon unsaturation, in the presence of an alkali metal alcoholate catalyst.

14. The process according to claim 13, wherein the unsaturated oxirane is selected from the group consisting of oxiranes of the formula

in which $R^4$ is a radical of the formula $CH_2=CH-(CH_2)_q-(O-CH_2)_p-$, wherein $1 \leq q \leq 6$ and $p=0$ or 1, or a radical of the formula $CH_3-(CH_2)_y-CH=CH-(CH_2)_x-(OCH_2)_p$, wherein $0 \leq x+y \leq 5$ and $p=0$ or 1.

15. The process according to claim 1, wherein the first step consists of preparing a block copolymer containing at least one solvating segment A consisting of oxyalkylene units in which the alkylene group optionally carries a methyl substituent, and at least one segment B consisting of oxyalkylene units in which the alkylene group carries a substituent containing carbon-carbon unsaturation which can be radically polymerized and which is inert to the copolymerization conditions of the first step of the process and/or oxyalkenylene units in which the carbon-carbon double bond can be radically polymerized.

16. A copolymer prepared by a process of claim 1.

17. An ionically conductive material containing the copolymer of claim 1.

18. A copolymer of a polycondensate whose macromolecular chain consists essentially of solvating units capable of inducing crystallinity into the copolymer or polycondensate, units which decrease the crystallinity of the copolymer or of the polycondensate and crosslinkable units, all of these units being oxyalkylene units or oxyalkenylene units independently of one another, consisting essentially of:

- alkylene oxide solvating units obtained from a cyclic alkylene oxide or a cyclic acetal monomer containing at least three chain units, unsubstituted or methyl substituted, which are capable of inducing crystallinity into the copolymer or polycondensate;

- crosslinkable alkylene oxide units which are obtained from a cyclic alkylene oxide or a cyclic acetal monomer containing at least three chain units carrying a substituent which contains a carbon-carbon double bond; and

- units which decrease the crystallinity of the copolymer or of the polycondensate and are similar to the crosslinkable units, except that the carbon-carbon double bond is replaced with a saturated —C—C-bond.

19. The copolymer or polycondensate of claim 18, wherein the crosslinkable units have the formula: —O—CH($CH_2$—O—$CH_2$—CH=$CH_2$)—$CH_2$— units obtained from allylglycidyl ether and a unit which permits a decrease in the crystallinity of the copolymer of the formula: —O—CH($CH_2$—O—$CH_2$—$CH_2$—$CH_2$)—$CH_2$— units.

20. An ionically conductive material containing the polymer of claim 18.

* * * * *